W. W. INMAN.
Cotton and Hay Presses.

No. 150,323. Patented April 28, 1874.

Witnesses
John L. Boone
C. M. Richardson

Walter W. Inman
by Dewey & Co.
Attys

UNITED STATES PATENT OFFICE.

WALTER W. INMAN, OF LONE PINE, CALIFORNIA.

IMPROVEMENT IN COTTON AND HAY PRESSES.

Specification forming part of Letters Patent No. 150,323, dated April 28, 1874; application filed October 15, 1873.

*To all whom it may concern:*

Be it known that I, WALTER W. INMAN, of Lone Pine, Inyo county, State of California, have invented an Improved Baling-Press; and I do hereby declare the following description and accompanying drawings are sufficient to enable any person skilled in the art or science to which it most nearly appertains to make and use my said invention or improvement without further invention or experiment.

My invention relates to certain improvements in presses for baling hay, cotton, and other substances; and it consists mainly in the combination of a lever, or a large and small pulley, for transmitting the power from a cone-pulley to the follower, so that I am enabled to give a gradually-increasing force upon the bale as it becomes more closely compressed.

Figure 1:
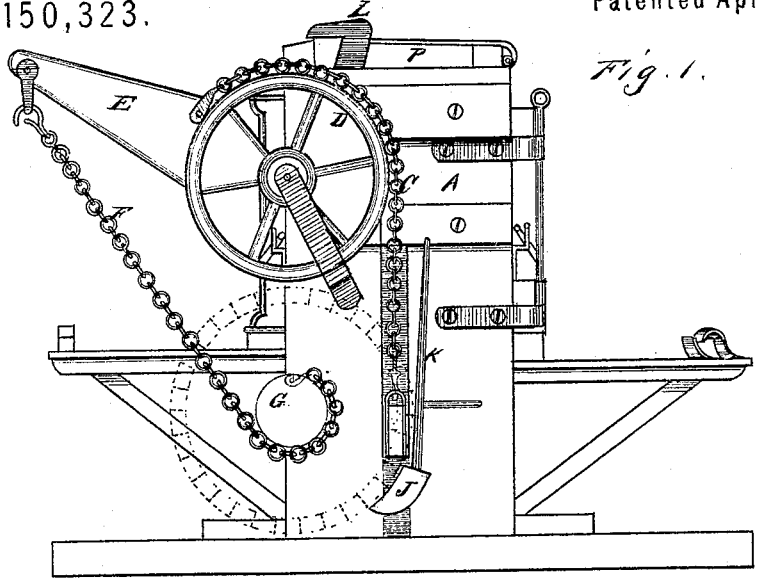
Figure 3:
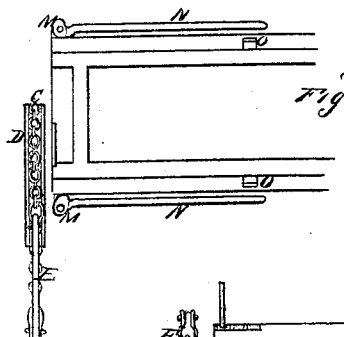
Figure 2:
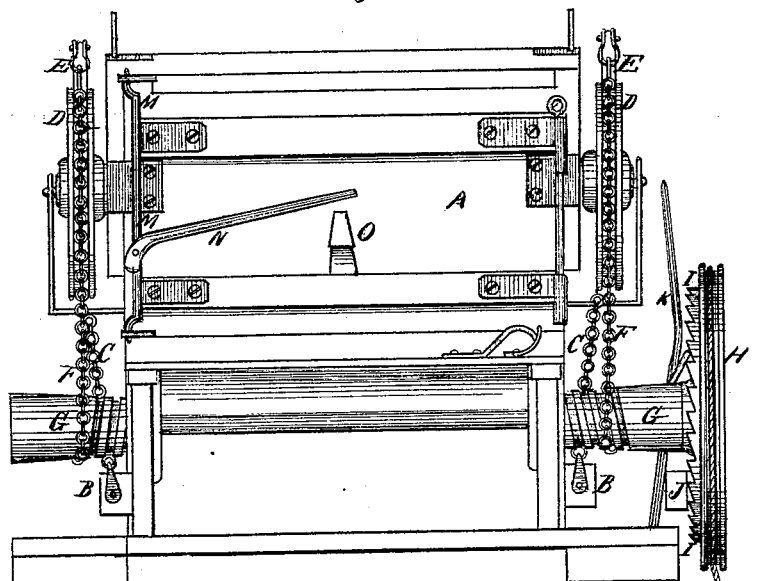

Referring to the accompanying drawings for a more complete explanation of my invention, Figure 1 is a side elevation of my press. Fig. 2 is a front elevation. Fig 3 is a view showing the locking device for the doors.

A is the box or body of the press, into which the material to be pressed is placed upon the follower, which moves upward from the bottom. B are the ends of the arms by which the follower is operated, these ends projecting through slotted openings in the sides of the press in the usual manner. Chains C from these ends pass up vertically to the pulleys D, over which they pass and wind up when power is applied. A lever-arm, E, projects from one side of each of the pulleys D, and a chain, F, is secured to the end of this arm, and passes from that point to the cone-pulley G, around which it winds, beginning at the larger part and passing upon the smaller as the follower rises and the bale becomes more compressed. At one end the shaft which carries the cone-pulleys is secured to the driving wheel or drum H, and around this the rope passes, to which the horse is attached.

The inside of the rim of this drum is provided with a ratchet, I, and the pawl J serves to hold the wheel stationary after the bale has been pressed and while it is being tied. This pawl is operated by a lever, K, so as to be easily thrown out of contact with the ratchet when it is desired to let the follower down for the purpose of filling the press for a new bale. The top or filling-door P of the press may be secured after closing by means of strong clamps or hooks L.

The operation of my press will be as follows: The follower being at the bottom and the side doors closed, the press is filled through the door P, which is then closed. Power being applied to the wheel H by means of the rope, the shaft and the cone-pulleys G will be rotated, thus winding up the chains F and drawing down on the arms E. This rotates the pulley D and winds up the chains C, which in turn lift up the end B of the follower and thus compress the bale. When fully compressed, the pawl J (which will be thrown into contact with the ratchet I by means of a spring) will hold the whole apparatus in place while the bale is being tied, and after the bale is turned out the pawl can be thrown off and the follower allowed to pass to the bottom of the press in readiness for another filling.

Having thus described my invention, what I claim, and desire to secure by Letters Patent, is—

The cone-pulleys G and chains F, in combination with the lever-arms E and pulleys D, and the chains C attached to the follower, constructed to operate substantially as and for the purpose herein described.

In witness whereof I hereunto set my hand and seal.

WALTER WEYMOUTH INMAN. [L. S.]

Witnesses:
WM. P. GEORGE,
I. N. FARWELL.